United States Patent Office 3,753,961
Patented Aug. 21, 1973

3,753,961
RESINOUS COMPOSITION
David R. St. Cyr, Uniontown, Ohio, assignor to The Goodyear Tire & Rubber Company, Akron, Ohio
No Drawing. Continuation-in-part of application Ser. No. 855,759, Sept. 5, 1969. This application Dec. 3, 1971, Ser. No. 204,714
Int. Cl. C08f 15/40
U.S. Cl. 260—80.78                   2 Claims

ABSTRACT OF THE DISCLOSURE

A resinous material, and method for its preparation, having a softening point of from about 70° C. to about 130° C. comprising from about 10 to about 80 percent units derived from vinyl toluene, from about 10 to about 80 percent units derived from α-methyl styrene, and from about 10 to about 50 percent units derived from styrene in which the mole ratio of vinyl toluene to styrene is from about 3/1 to about 1/1. The resinous material is prepared by polymerizing the monomers in the presence of an anhydrous catalyst selected from boron trifluoride, boron trifluoride etherate, aluminum chloride, ethyl aluminum dichloride and stannic chloride. The preferred catalyst is boron trifluoride. The resinous material of this invention has particular utility as resins for hot melt coatings and adhesives.

---

This is a continuation, of application Ser. No. 855,759, filed Sept. 5, 1969.

This invention relates to new synthetic resins and to a method of preparing such resins. In particular, this invention relates to the preparation of a resinous polymer comprising units derived from vinyl toluene, α-methyl styrene, and styrene.

Polymers of α-methyl styrene prepared in the presence of boron trifluoride at about 60° C. are typically of an oil low molecular weight, and primarily oil, therefore, not generally commercially useful. If the polymerization temperature is lowered sufficiently to raise the resin's softening point to at least about 100° C., the resulting polymer is taught to be not soluble in aliphatic solvents. Similarly, polymers of vinyl toluene, of styrene and copolymers of styrene with α-methyl styrene are taught to be typically insoluble in mineral spirits.

Thus, it is an object of this invention to provide a new and useful polymer derived from vinyl toluene, α-methyl styrene and styrene. It is a further object to provide a method for preparing such polymers. Other objects will become apparent as the description of the invention proceeds.

According to this invention, a resinous material is prepared by polymerizing a mixture comprising from about 10 to about 80 weight percent of vinyl toluene, from about 10 to about 50 weight percent of α-methyl styrene and from about 10 to about 50 weight percent of styrene, where the mole ratio of vinyl toluene to styrene is from about 3/1 to about 1/1 in the presence of an anhydrous catalyst selected from boron trifluoride, boron trifluoride etherate, aluminum chloride, ethyl aluminum dichloride and stannic chloride. Boron trifluoride is particularly suitable.

The resinous materials prepared according to this invention comprise from about 10 to about 80 percent units derived from vinyl toluene, from about 10 to about 50 percent units derived from α-methyl styrene and from about 10 to about 50 percent units derived from styrene where the mole ratio of vinyl toluene to styrene is from about 3/1 to about 1/1.

The resinous materials prepared according to this invention are typically light in color, having a Gardner color of from about 1 to about 3, and have softening points of from about 70° C. to about 130° C. according to ASTM Method E 28–58T. They are generally characterized by their good heat stability. Thus, they have particular utility in hot melt coatings and adhesives by mixing with various materials such as polyethylene.

In carrying out the polymerization reaction, the mixture of monomers is brought in contact with the anhydrous catalyst. If the catalyst is used in gaseous form, it is generally bubbled through a mixture of the monomers and a suitable solvent. If the catalyst is used in liquid or particulate form, it is simply contacted with the monomers in solution. When a particulate catalyst is used, it typically has a particle size in the range of from about 5 to about 200 mesh size, although larger or smaller particles can be used. Although the amounts of catalyst is not critical, a sufficient amount of catalyst is used to cause a polymerization reaction to occur. The catalyst may be added to the monomer mixture or the monomer mixture may be added to the catalyst. If desired, the catalyst and mixture of monomers may be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and reaction conducted without a diluent being present. Various diluents which are inert in that they do not enter into the polymerization reaction may be used. Representative examples of inert diluents are aliphatic hydrocarbons such as pentane, hexane and heptane, aromatic hydrocarbon such as toluene and benzene, and unreacted residual hydrocarbons from the reaction.

A wide range of temperatures can be used for the polymerization reaction with an inversely corresponding range of the resins softening point. The polymerization can be carried out over a wide range of temperatures from about —20° C. to about 100° C., although usually it is carried out in the range of from about 0° C. to about 50° C. The polymerization reaction pressure may be atmospheric or above or below atmospheric pressure. Generally, a satisfactory polymerziation can be conducted when the reaction is carried out at about autogenous pressure developed by the reactor under the operating conditions used. The time of the reaction can typically vary from a few seconds to 12 hours or more.

The resinous compositions of this invention are generally soluble up to at least 20 weight percent of the resin and usually up to at least 50 weight percent at about 25° C. based on the total resin in such solvents as mineral spirits, sometimes known as petroleum spirits (ASTM D-484-52) and Stoddard solvent (ASTM D-484-52).

The following examples further illustrate the invention and are not intended to be limiting. In these examples, parts and percentages are by weight unless otherwise indicated.

EXAMPLE I

Into a reactor fitted with a stirrer, condenser, thermometer, and nitrogen purge system, after purging with nitrogen, was placed 400 parts of toluene in which was then dissolved 0.4 part of boron trifluoride. A mixture of monomers was prepared in a separate container containing 200 parts of vinyl toluene, 100 parts of a α-methyl styrene and 100 parts of a styrene mixture having the following composition:

TABLE 1

| Components: | Percent |
|---|---|
| Benzene and/or toluene | 0.2 |
| Vinyl cyclohexene | 12.1 |
| Unknown | 0.1 |
| Ethyl benzene | 1.8 |
| Xylenes | 3.2 |
| Isopropyl benzene | 0.5 |
| Styrene | 81.8 |
| Unknown | 0.1 |
| | 100.0 |

To the reactor containing the toluene and boron trifluoride was added the monomer mixture dropwise over a period of one hour and 10 minutes with stirring and cooling to keep the temperature at about 30° C. Stirring of the reaction was continued for an additional hour. The mixture was neutralized with 15 parts of lime, 15 parts of attapulgus clay at about 70 to about 75° C. for 1½ hours. The mixture was filtered to remove the clay and lime and the filtrate distilled to a pot temperature of about 280° C. under a nitrogen atmosphere. Steam at 250° C. was then added and distillation continued until 36 parts of oil was collected. The hot resin in the pot was then poured into an aluminum pan and cooled to about 25° C. The yield of resinous material was 335 parts (83.8 percent yield) of a clear water white resin having a Gardner color of less than 1 and a softening point of 102° C. according to ASTM Method E 28–58T.

A material balance conducted around the reaction indicated the resinous material to have the following composition:

TABLE 2

| Component: | Percent |
|---|---|
| Vinyl toluene | 52.4 |
| α-Methyl styrene | 21.4 |
| Styrene | 21.4 |
| Other | — |
| | 100.0 |

EXAMPLE II

Additional resinous materials were made according to the general method of Example I at various temperatures using various amounts of vinyl toluene, α-methyl styrene, and styrene, as shown in Table 3. Also in Table 3 are shown results of change in color, if any, after heat aging the resins for 5 hours in air atmosphere at about 177° C. The results indicate that the resins are highly heat stable and, therefore, have enhanced utility as tackifiers for hot melt coatings and adhesives. The table also shows the resins have the additional desirable property of very low volatility as shown by the percent volatilized after 5 hours at 350° F.

TABLE 3

| | Run Number | | |
|---|---|---|---|
| | A 4575-113-4 | B 4575-1371-1 | C 4575-134-6 |
| Feed composition (percent): | | | |
| Vinyl toluene | 50 | 50 | 40 |
| Methyl styrene | 25 | 25 | 20 |
| Styrene stream | 25 | 25 | 40 |
| Reaction temperature (° C.) | 30 | 0 | 30 |
| Percent yield | 76 | 77.8 | 70.7 |
| Softening point (° C.) | 104 | 120 | 102 |
| Initial Gardner color | 1 | 1 | 1 |
| Color after 5 hours at 350° F | 1 | 1 | 2½ |
| Percent volatilized after 5 hours at 350° F | 0.31 | 0.18 | 0.39 |

The resinous compositions of this invention are particularly useful in hot melt adhesives. In many applications of hot melt adhesives, it is desired that the hot melts have good color and thermal stability and do not degrade at their elevated temperatures of application. When used in hot melts the resinous compositions of this invention are typically present in an amount of from about 10 to about 70 weight percent of a hot melt composition or adhesive. Various thermoplastic polymers can be mixed with the resinous composition such as, for example, polyethylene, polypropylene, polybutene, ethylene-propylene copolymers, ethylene-vinyl acetate and ethylene acrylate. Particularly useful thermoplastic polymers are poylyethylene, ethylene-vinyl acetate and ethylene-acrylate. Other various thermoplastic polymers can be used preferably having a melt flow (ASTM Method B 1238–57T) of from about 5 to about 5000 and a viscosity of from about 100 centipoise to about 5000 centipoise at about 350° F. In practice, because of their good color, thermo-stability and low volatility, the hot melt composition has wide application in the field of coatings and particularly as hot melt adhesives.

What is claimed is:

1. A resinous material having a softening point of from about 70° C. to about 130° C. and soluble up to at least 50 weight percent of the resin at 25° C. in mineral spirits and in Stoddard solvent (ASTM D-484-52) consisting essentially of about 10 to about 80 percent units derived from vinyl toluene, from about 10 to about 80 percent units derived from α-methyl styrene, and from about 10 to about 50 percent units derived from styrene in which the mole ratio of vinyl toluene to styrene is from about 3/1 to about 1/1, prepared by the method which comprises polymerizing from about 10 to about 50 weight percent of α-methyl styrene, and from about 10 to about 50 weight percent styrene, where the mole ratio of vinyl toluene to styrene is from about 3/1 to about 1/1, in the presence of an anhydrous catalyst selected from boron trifluoride, boron trifluoride etherate, aluminum chloride, ethyl aluminum dichloride and stannic chloride.

2. The resinous material of claim 1 having essentially the structure of a resinous material prepared by polymerizing the said mixture in the presence of a diluent, selected from aliphatic and aromatic hydrocarbons, at a temperature of from about 0° C. to about 50° C. with boron trifluoride.

References Cited

UNITED STATES PATENTS

| 2,698,841 | 1/1955 | McKay | 260—45.5 |
| 2,987,508 | 6/1961 | Ruffing | 260—85.5 |
| 3,048,562 | 8/1962 | Cull | 260—45.5 |
| 3,427,275 | 2/1969 | Davis | 260—31.8 |

JOSEPH L. SCHOFER, Primary Examiner

R. S. BENJAMIN, Assistant Examiner

U.S. Cl. X.R.

156—334; 260—897 A